United States Patent [19]

Kramer et al.

[11] Patent Number: 4,962,493
[45] Date of Patent: * Oct. 9, 1990

[54] RECORD CARRIER WITH A FOLLOW-ON TRACK AND APPARATUS FOR RECORDING INFORMATION THEREON

[75] Inventors: Pieter Kramer; Jan Roos, both of Eindhoven, Netherlands

[73] Assignee: U.S. Philips Corporation, New York, N.Y.

[*] Notice: The portion of the term of this patent subsequent to Feb. 21, 2006 has been disclaimed.

[21] Appl. No.: 262,555

[22] Filed: Oct. 25, 1988

Related U.S. Application Data

[63] Continuation of Ser. No. 499,571, May 31, 1983, Pat. No. 4,807,209, which is a continuation of Ser. No. 318,169, Nov. 4, 1981, abandoned, which is a continuation of Ser. No. 127,354, Mar. 5, 1980, abandoned, which is a continuation of Ser. No. 902,713, May 4, 1978, abandoned, which is a continuation of Ser. No. 619,039, Oct. 2, 1975, abandoned, which is a continuation of Ser. No. 431,422, Jan. 7, 1974, abandoned.

[30] Foreign Application Priority Data

Feb. 9, 1973 [NL] Netherlands .......... 7301830

[51] Int. Cl.$^5$ .......... G11B 7/095; G11B 7/00
[52] U.S. Cl. .......... 369/44.11; 369/275.1
[58] Field of Search .......... 369/275, 277–279, 369/44–46, 109–111; 365/120, 124, 127; 250/202, 578

[56] References Cited

FOREIGN PATENT DOCUMENTS 2038874 2/1972 Fed. Rep. of Germany .
2048431 4/1972 Fed. Rep. of Germany .

Primary Examiner—Vincent P. Canney
Assistant Examiner—Steven R. Garland
Attorney, Agent, or Firm—John Francis Moran

[57] ABSTRACT

An apparatus for recording information on a disk-shaped record carrier body by a beam of radiation. The carrier body comprises a diffractive follow-on track which is capable of being scanned with an opto-electronic system so as to produce an electrical signal for controlling the position of the beam during recording of the information.

11 Claims, 1 Drawing Sheet

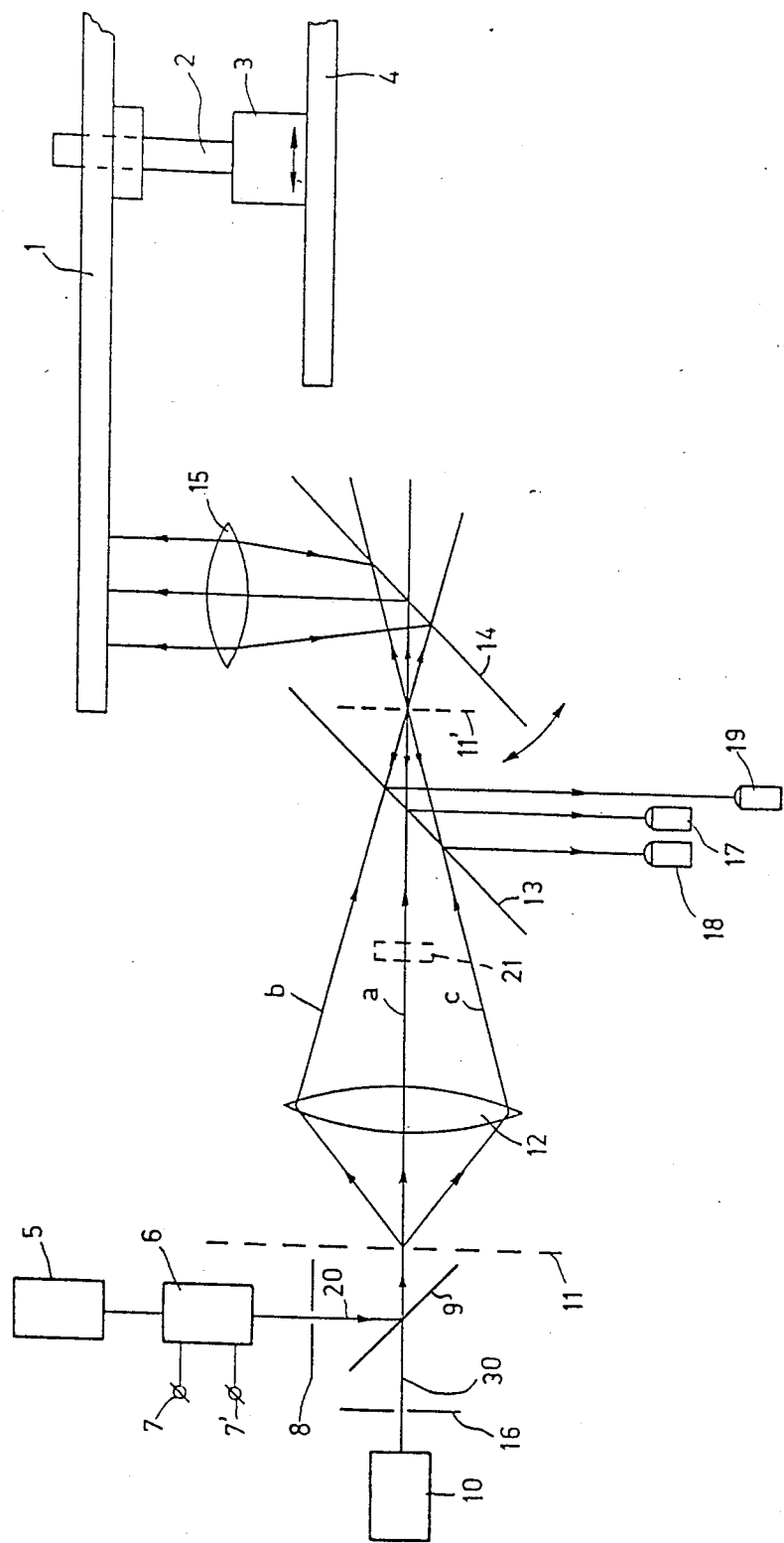

RECORD CARRIER WITH A FOLLOW-ON TRACK AND APPARATUS FOR RECORDING INFORMATION THEREON

This is a continuation of application Ser. No. 499,571, U.S. Pat. No. 4,807,209, filed 5/31/83 which is a continuation of abandoned application Ser. No. 318,169 filed 11/4/81 which is a continuation of abandoned application Ser. No. 127,354 filed 3/5/80 which is a continuation of abandoned application Ser. No. 902,713 filed 5/4/78 which is a continuation of abandoned application Ser. No. 619,039 filed 10/2/75 which is a continuation of abandoned application Ser. No. 431,422 filed 1/7/74.

The invention relates to a disk-shaped record carrier body, intended to be provided with information, for example video and/or audio-information, in an optically readable form. The record body has a substantially information-free follow-on track on the surface thereof on which the information is to be stored. The follow-on track is intended to be optically scanned and, in conjunction with an opto-electronic system, to produce an electric signal which is suitable for causing a write beam to automatically follow the follow-on track.

The record carrier body is intended to be written on by a device which substantially corresponds to that for reading a record carrier. A "record carrier" as used herein is to be understood to mean a record carrier body provided with information. If required, in the read device an additional (write) radiation source as well as a modulation device which is controlled by the information to be written, are included so as to permit a user, in addition to reading a pre-recorded record carrier, to record information on the record carrier body.

As used herein "information" is to be understood to mean that which is reproduced when reading the record carrier.

The opto-electronic device, which in the read apparatus is used for determining the position of the read beam relative to the track to be read during reading, may also be used to ensure that during information writing, the write beam accurately follows the track provided on the record carrier body, hereinafter referred to as a "follow-on track" for the sake of brevity. The follow-on track can be optically discriminated from the rest of the record carrier body by making said track V-shaped and pressing it in the surface of the record carrier body, as described in German Patent Application No. 2,038,874. The V-shaped groove causes a beam of radiation to be split into two sub-beams, the intensities of the sub-beams being defined by the degree of centering of the radiation beam relative to the groove.

It is an object of the invention to indicate other possibilities of optically discriminating the follow-on track. The record carrier body according to the invention is characterized in that the follow-on track is a flat track, and that the follow-on track influences the direction of a radiation beam in the same way as, but the radiation distribution over a beam section in a different way, than the rest of the surface of the record carrier body on which the information is to be written.

If the information recorded in the material can be read-out after a time interval of the order of the duration of one revolution of the record carrier body after it has been written, it suffices according to the invention if the follow-on track extends over a relatively small part of the information surface as long as it is describes at least one full revolution on said surface.

It is to be noted that it is known from U.S. Pat. No. 3,391,255 to use a follow-on track which is located in one plane and which has an absorption coefficient which differs from its surrounding for writing on an information-carrier body. However, the follow-on track is then not provided on the write surface of the record carrier body, but on an additional disk. This imposes strict requirements on the bearing of the disk and on the synchronism of the movements. Moreover, a fairly intricate set-up is required.

The invention will now be described in more detail, inter alia with reference to the drawing, in which an embodiment is shown of a device according to the invention for writing on a record carrier body, as well as for reading a record carrier provided with information.

The follow-on track may be provided at the surface of the record carrier body in different forms. For example, the reflection coefficient or the absorption coefficient of the follow-on track may differ from its surrounding, so that the intensity of a beam which emerges from the record-carrier body differs according to whether the beam has or has not interacted with the track. However, it is also possible to make the follow-on track interact with the polarization condition of the beam in a different way than with the area surrounding the track. Changes in the direction of polarization of the beam can then be converted into intensity differences with the aid of a polarization sensitive element. It is also possible to employ a follow-on track which under the influence of an incident beam starts to emit radiation in a manner which differs from its surrounding area. The emission of radiation by the follow-on track may be based on a fluorescence mechanism.

The follow-on track can be provided on the record carrier body in accordance with different methods, depending on the nature of information storage in the final record carrier. For example, a photo-resist may be coated onto the disk-shaped record carrier body. This coating may be exposed to continuous radiation, the carrier body, for example, being also subjected to a radial displacement in addition to a rotation relative to the radiation source. Thus, a spiral track is exposed. Depending on the type of photo-resist, either the exposed or the non-exposed parts will disappear upon development, so that the substrate, for example a reflecting layer, appears which layer can be etched away or can be rendered absorbent.

For the provision of the follow-on track use can also be made of different information storage techniques. For example, a layer of a magneto-optical or photochromic material can be spirally and continuously exposed with a high-power radiation beam, so that the polarizing properties or the color properties of the layer are changed.

Generally, the record carrier body is then exposed twice. First of all a continuous follow-on track is provided, for example, during the manufacture of the record carrier body. The information is recorded, for example by the user himself, by intermittently exposing the record carrier body in accordance with the information.

The drawing shows an embodiment of a device according to the invention which permits both writing and reading of the information.

The reflecting disk-shaped record carrier body 1, which is provided with a follow-on track, is rotated about a shaft 2 by a motor 3, which by means of a slide 4 is movable in a radial direction. A source 5, for example a laser, emits a beam 20, of which for simplicity only one ray is shown. Included in the radiation path from the source 5 to the record carrier body, is an electro-optical modulator 6. Said modulator is controlled by a signal applied to the terminals 7, 7' and ensures that at certain instants and during certain periods, in accordance with the signal representing the information, a radiation spot is imaged onto the radiation-sensitive layer of the record carrier body.

The modulated beam 20 is reflected by a semi-transparent mirror 9 to a phase grating 11. This phase grating forms three secondary beams from the beam 20, viz. one zero-order beam, beam a, and two first-order beams, beams b and c. Radiation source 10, for example a laser, emits a beam 30. Said beam passes through the semi-transparent mirror 9 and, like the write beam 20, it is diffracted into different orders.

When writing on the record carrier body, the beam 30 is interrupted, for example, by closing aperture 16. The beam a is then a write beam. For reading purposes aperture 8 is closed and aperture 16 is open so that beam a then forms the read beam.

A lens 12 forms an image 11' of the grating 11, for example, in the focal plane of a lens 15. The two radiation spots produced by the first-order beams b and c are projected onto the edges of the follow-on track during writing and onto the edges of the information track during reading. The central radiation spot, formed by the zero-order beam is projected in the center of the follow-on track or the information track, respectively. Especially during writing care is taken that the power of the first-order beams is low, so as to prevent writing by these beams.

The beams reflected by the record carrier body are reflected via a rotatable mirror 14 and a semi-transparent mirror 13 to the radiation-sensitive detection system, comprised of the detectors 17, 18 and 19.

Detector 17 is the high-frequency information detector which during reading supplies a signal which is representative of to the stored information. By comparing the signals supplied by the detectors 18 and 19, an indication can be obtained as to the positions of the radiation spots, and thus of the read and write beams, relative to the information track, and the follow-on track respectively. The signals supplied by the detectors 18 and 19 can be electronically processed into a control signal by means of which said positions can be corrected, for example, by rotating the mirror 14.

By making the chief rays of the beams b and c impinge on the record carrier body at an acute angle, and by splitting one of the detectors 18 or 19 into two sub-detectors, the position of the plane of the track portion to be read relative to the detection system can be determined as described in U.S. Pat. No. 3,876,842.

An alternative solution for determining the position of the plane of the track portion to be read relative to the detection system is described in U.S. Pat. No. 3,876,841. By including the same imaging element in the radiation path between the radiation source and the record carrier body and in the radiation path between the record carrier body and the detection system, the deviation between the actual position of the plane of the track and the desired position of said plane can be detected without using the information stored in the record carrier.

The device according to the Figure, in which three radiation spots are formed on the record carrier body and the record carrier respectively both of the write source and of the read source respectively, is a preferred embodiment of the device according to the invention. It is also possible to form only one image of the radiation source, which supplies the write energy, onto the record carrier body and to determine the position of said image with the first-order sub-beams, emerging from the radiation source which produces the read beam. The zero-order beam of this source is then interrupted.

The type of radiation sources used for writing and reading respectively, is determined by the type of material in which the information is stored. In some cases it suffices to use a single radiation source 10 for writing and reading. The path of the beam 30a then includes an element, which affects the character of the radiation and which discriminates the write beam and the read beam from each other. For example, if a magneto-optical material is used as a storage material, the source 10 may be a high-power laser source whose radiation during writing is directly incident on the record carrier body and which illuminates the record carrier during reading via a polarizer (21), which reduces the radiation intensity.

The method of position detection of the write beam described with reference to the Figure is only one of the possibilities. The methods of determining the position of a read beam relative to an information track on a record carrier which are described in previous Patent Applications can also be used for writing on a record carrier body previded with a follow-on track. For example, in analogy with what is described in U.S. Pat. No. 3,833,769, a grating-shaped part of the record carrier body can be imaged onto a radiation-sensitive detector disposed behind a grating.

If the follow-on track is a moulded groove track this track can also be followed with a radiation spot which is greater than the width of said track, as is described in U.S. Pat. No. 3,956,582.

If writing is effected on a material such that the recorded information can be read after a time interval of the order of the duration of one revolution of the record carrier body, or shorter, subsequent to writing, for example, a magneto-optic or a photo-chromic material, it suffices according to the invention if the follow-on track extends over one or several circles, or quasi-circles in the case of a spiral track. When writing information in an $n^{th}$ track circle, or quasi-track circle, the information written on the $(n-1)^{th}$ track circle, or quasi-track circle, may then be used as a follow-on track. In the write/read device care should then be taken that the projections of the radiation sources, which supply the write beam and the read beam respectively, have shifted radially by one track width.

According to the invention, the follow-on track provided by the manufacturer of the record carrier body, which track extends over one or several circles or quasi-circles can be used for storing data which are useful in the write-operation. In this respect a test pattern might be conceived by means of which the write and/or read device can be tested. It is also possible to store data about the record carrier body itself or a factory name in said part of the follow-on track.

In the case of a spiral follow-on track, a spiral may be selected having a pitch which initially is comparatively great and which gradually decreases so that after one or several revolutions over the record carrier a lower, constant pitch is attained. At the beginning of the write-operation this will facilitate the positioning of the write beam relative to the record carrier body.

What is claimed is:

1. An apparatus for writing information with a write beam of radiation on a disk-shaped record carrier body having a radiation sensitive layer and a continuous, generally circular diffractive follow-on track extending about the center of said disk-shaped record carrier body, said apparatus comprising means for projecting said write beam onto said radiation sensitive layer so as to write information thereon upon relative movement between said carrier body and said write beam, and means for guiding said write beam during recording of said information, said guiding means including means for forming a spot of radiation of a predetermined size on said follow-on track, said follow-on track being configured to diffract radiation of said spot incident thereon when scanned with said spot and having a width which is smaller than the dimension of said spot in the width direction so that the intensity distribution of radiation coming from said record carrier body varies with movement of said spot relative to the center of said follow-on track in a direction transverse to the track direction due to said diffraction so as to enable the position of said spot relative to said follow-on track to be determined, and means responsive to said radiation coming from said record carrier body for controlling the position of said write beam during writing of the information on said radiation sensitive layer.

2. The apparatus according to claim 1 wherein the surface of said carrier body is reflective so that the diffracted radiation of said spot is reflected back from the record carrier body.

3. The apparatus according to claim 1 including a plurality of said circular follow-on tracks which define turns of a spiral follow-on track extending across the surface of said carrier body.

4. The apparatus according to claim 1 wherein said follow-on track is a groove formed in said record carrier body.

5. The apparatus according to claim 1, 2, or 4 wherein said follow-on track contains prerecorded data and includes means for reading said prerecorded data.

6. The apparatus according to claim 1, 2, 3 or 4 wherein said means for guiding includes at least one radiation sensitive detector positioned in the path of said radiation coming from said record carrier body, said detector supplying an electrical signal indicative of the intensity of said radiation incident thereon.

7. The apparatus according to claim 1, 2, 3 or 4 including means for modulating said write beam in accordance with information to be recorded and means for rotating said carrier body about the center thereof so that a generally circular information track is recorded in said radiation sensitive layer upon rotation of said record carrier body.

8. An apparatus according to claim 6, wherein said guide means includes means for moving said write beam in a direction transverse to the direction of said follow-on track in response to said electrical signal.

9. The apparatus according to claim 3 wherein said spiral follow-on track contains prerecorded data and includes means for reading said prerecorded data.

10. An apparatus for writing information with a write beam of radiation on a record carrier body having a radiation sensitive layer and a diffractive follow-on track in the form of an elongated groove formed in said record carrier body, said apparatus comprising means for projecting said write beam onto said radiation sensitive layer so as to write information thereon upon relative movement between said carrier body and said write beam, and means for guiding said write beam during recording of said information, said guiding means including means for forming a spot of radiation of a predetermined size on said groove, said groove being configured to diffract radiation of said spot incident thereon when scanned with said spot and having a width which is smaller than the dimension of said spot in the width direction so that the intensity distribution of radiation coming from said record carrier body varies with movement of said spot relative to the center of said groove in a direction transverse to the longitudinal direction of said groove due to said diffraction so as to enable the position of said spot relative to said groove to be determined, and means responsive to said radiation coming from said record carrier body for controlling the position of said write beam during writing of the information on said radiation sensitive layer.

11. A record carrier body for recording thereon information with a write beam of radiation, said record carrier body having a radiation-sensitive layer on which the information to be recorded is written with the write beam and a diffractive follow-on track in the form of an elongated groove formed in said record carrier body for guiding the write beam during recording of the information, said groove being configured to diffract radiation incident thereon when scanned with a spot of radiation of a predetermined size and having a width which is smaller than the dimension of the spot in the width direction so that the intensity distribution of the radiation coming from the record carrier body varies with movement of the spot relative to the center of said groove due to said diffraction so as to enable the position of the spot relative to said groove to be determined.

* * * * *